US011384016B1

United States Patent
Alhozaimy et al.

(10) Patent No.: US 11,384,016 B1
(45) Date of Patent: Jul. 12, 2022

(54) ADDITIVE FOR REINFORCED CONCRETE

(71) Applicants: Abdulrahman Alhozaimy, Riyadh (SA); Raja Rizwan Hussain, Riyadh (SA); Abdulaziz Al-Negheimish, Riyadh (SA); Devendra Deo Narain Singh, Riyadh (SA)

(72) Inventors: Abdulrahman Alhozaimy, Riyadh (SA); Raja Rizwan Hussain, Riyadh (SA); Abdulaziz Al-Negheimish, Riyadh (SA); Devendra Deo Narain Singh, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 17/516,636

(22) Filed: Nov. 1, 2021

(51) Int. Cl.
*C04B 24/12* (2006.01)
*C04B 24/08* (2006.01)
(Continued)

(52) U.S. Cl.
CPC ............ *C04B 24/129* (2013.01); *C04B 14/48* (2013.01); *C04B 24/085* (2013.01); *C04B 28/02* (2013.01); *C04B 40/0039* (2013.01); C04B 2103/0093 (2013.01); C04B 2103/406 (2013.01); C04B 2103/61 (2013.01)

(58) Field of Classification Search
CPC ..... C04B 24/129; C04B 14/48; C04B 24/085; C04B 28/02; C04B 40/0039; C04B 2103/0093; C04B 2103/406; C04B 2103/61; C04B 24/28; C23F 11/00; C23F 11/12; C23F 11/14; C23F 11/146;
(Continued)

(56) References Cited

U.S. PATENT DOCUMENTS

| 5,262,089 A | 11/1993 | Bobrowski et al. |
| 5,597,514 A | 1/1997 | Miksic et al. |

FOREIGN PATENT DOCUMENTS

| CN | 102584080 A | 7/2012 |
| CN | 102757197 A | * 10/2012 |

(Continued)

OTHER PUBLICATIONS

CN-102757197-A, Liu, machine translation (Year: 2012).*

(Continued)

*Primary Examiner* — Kevin E Yoon
*Assistant Examiner* — Marites A Guino-O Uzzle
(74) *Attorney, Agent, or Firm* — Nath, Goldberg & Meyer; Richard C. Litman

(57) ABSTRACT

The additive for reinforced concrete is a concrete additive for preventing corrosion of steel rebars in steel-reinforced concrete, improving the workability of the cast concrete, and reducing water absorption/permeability in the cast concrete. The reinforced concrete may be a conventional reinforced concrete, such as that formed from a mixture of water, an aggregate and cement, having at least one steel rebar embedded in the mixture. The additive is added to the mixture prior to curing and casting. The additive may for example, have a concentration with respect to the cement of between 0.25 wt % and 1.0 wt %. The additive includes a triazole and a non-ionic surfactant including a poly oxy ethoxylated reaction product of sorbitan and a fatty acid. The triazole and the non-ionic surfactant are dissolved in the solvent.

10 Claims, 3 Drawing Sheets

(51) Int. Cl.
*C04B 40/00* (2006.01)
*C04B 28/02* (2006.01)
*C04B 14/48* (2006.01)
*C04B 103/61* (2006.01)
*C04B 103/00* (2006.01)
*C04B 103/40* (2006.01)

(58) Field of Classification Search
CPC .... C23F 11/148; C23F 11/149; C09D 123/08; C09D 5/08
See application file for complete search history.

(56) References Cited

FOREIGN PATENT DOCUMENTS

| | | | |
|---|---|---|---|
| CN | 108751780 A | * | 11/2018 |
| CN | 112125565 A | | 12/2020 |
| CN | 112374791 A | | 2/2021 |
| KR | 101690488 B1 | | 12/2016 |

OTHER PUBLICATIONS

CN-108751780-A, Kun, machine translation (Year: 2018).*
Karpagavalli Ramji, Darran R. Cairns, S. Rajeswari, Synergistic inhibition effect of 2-mercaptobenzothiazole and Tween-80 on the corrosion of brass in NaCl solution, Applied Surface Science, v.254, iss. 15, 2008, pp. 4483-4493. DOI:10.1016/j.apsusc.2008.01.031 (Year: 2008).*

* cited by examiner

ADDITIVE FOR REINFORCED CONCRETE

BACKGROUND

1. Field

The disclosure of the present patent application relates to a treatment composition for steel rebar embedded in concrete, and particularly to an additive for reinforced concrete to help inhibit corrosion of the steel rebar, improve the workability of the concrete, and reduce water absorption/permeability in the concrete.

2. Description of the Related Art

Steel rebar is commonly used for the reinforcement of concrete. Typical manufactured steel rebar is often coated with black oxide (i.e., "mill scale"), which is a mixture of three phases of iron oxide, namely, wüstite (FeO) near the steel surface, magnetite ($Fe_3O_4$) above the layer of wüstite, and a top portion of the scale formed from hematite ($\alpha$-$Fe_2O_3$). These layers of iron oxide develop cracks, since their coefficients of expansion and compaction due to changes in temperature differ to a more significant extent than those of the steel structure.

Rebars covered in mill scale, along with rust, are mistakenly considered to provide protection against corrosive attack on their surfaces when embedded in concrete. The presence of the mill scale actually accelerates corrosive reactions. This is due to the cracks that form in the scale, as well as the presence of unstable oxides of iron. Both the cracks and the unstable iron oxides are conducive to the formation of galvanic cells, which accelerate corrosive reactions in the rebar.

Due to the problems associated with mill scale, descaling of the rebar prior to its embedding in concrete may be performed. Although descaling improves general corrosion resistance of the rebar, and also increases the threshold chloride concentration for the onset of a corrosion pitting attack, the process of descaling (typically conducted on-site) is very expensive and time-consuming, and also requires cumbersome equipment. Other methods include surface coating, the use of corrosion inhibitors, and the application of cathodic protection. However, the compositions and methods involved for each of these techniques are not only expensive, but have a tendency to affect the quality of the concrete, as well as the bond strength between the concrete and the rebar. Thus, an additive for reinforced concrete solving the aforementioned problems is desired.

SUMMARY

The additive for reinforced concrete is a concrete additive for inhibiting corrosion of steel rebars in reinforced concrete, improving the workability of the cast concrete, and reducing water absorption/permeability in the cast concrete. The reinforced concrete may be a conventional reinforced concrete, such as that formed from a mixture of an aggregate, water, and cement, and has at least one steel rebar embedded in the mixture. The additive is added to the mixture prior to curing and casting. The additive may have, for example, a concentration with respect to the cement of between 0.25 wt % and 1.0 wt %. The additive includes a triazole and a non-ionic surfactant including a poly oxy ethoxylated product of the reaction between sorbitan and a fatty acid, i.e., an ethoxylated sorbitan ester. The triazole and the non-ionic surfactant are dissolved in the solvent.

The solvent may be, for example, methanol, ethanol, propanol, isopropanol, butanol, isobutanol, water, or combinations thereof. The triazole may be, for example, 1,2,3-benzotriazole, tolyltriazole, or other triazole. Exemplary fatty acids include oleic acid and stearic acid. The non-ionic surfactant may be, for example, polyoxyethylene sorbitan monooleate (also referred to as polysorbate 80, and sold commercially as TWEEN® 80) or polyoxyethylene sorbitan monostearate (also referred to as polysorbate 60, and sold commercially as TWEEN® 60).

The weight-to-volume ratio of the non-ionic surfactant in the solvent may be between 50% and 90%. The concentration of the triazole with respect to the non-ionic surfactant and the solvent may be between 0.25 wt % and 25.0 wt %, and preferably between 2.5 wt % and 20.0 wt %, and more preferably between 5.0 wt % and 15.0 wt %.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
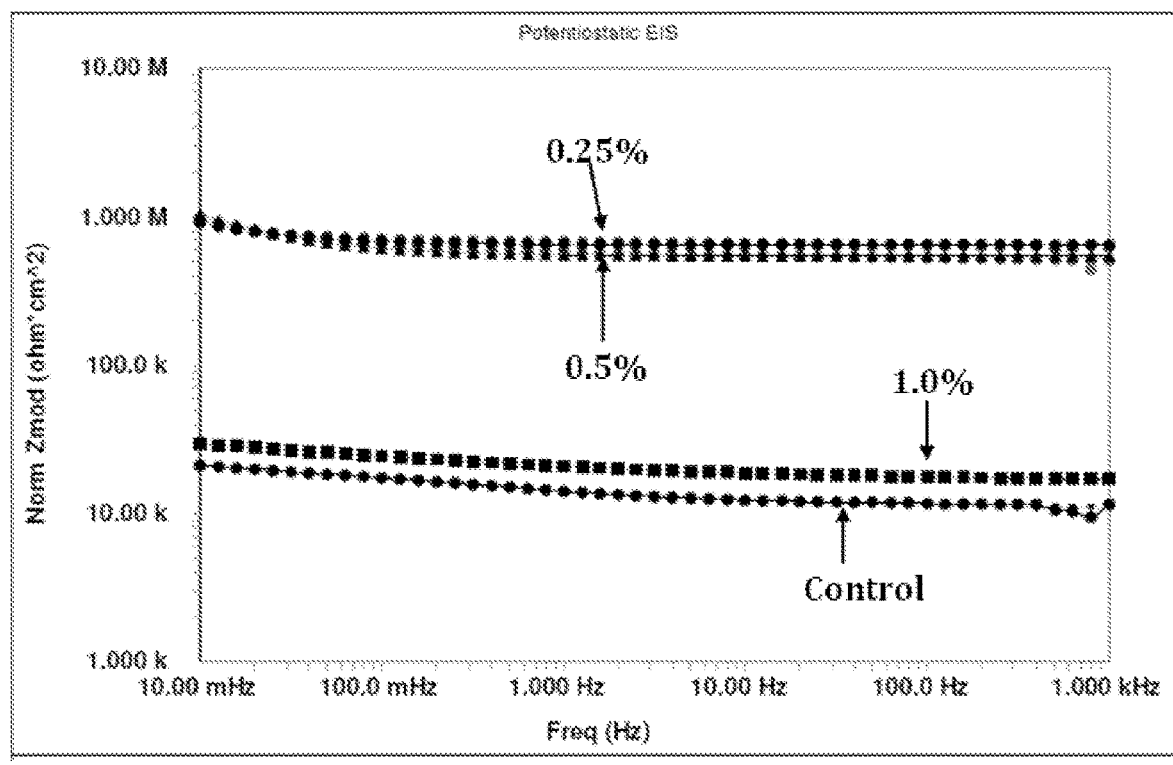
FIG. 1A is a composite comparing electrochemical impedance spectroscopic (EIS) plots (Bode plots of the magnitude of the impedance as a function of frequency) for a control sample of steel rebar embedded in concrete and samples of steel rebar embedded in concrete and treated with the additive for reinforced concrete at varying concentrations.

The additive for reinforced concrete is a concrete additive for preventing corrosion of steel rebars in steel-reinforced concrete, improving the workability of the cast concrete, and reducing water absorption/permeability in the cast concrete. The reinforced concrete may be a conventional reinforced concrete, such as that formed from a mixture of water, an aggregate, and cement, with at least one steel rebar embedded in the mixture. The additive is added to the mixture prior to curing and casting. The additive may, for example, have a concentration with respect to the cement of between 0.25 wt % and 1.0 wt %. The additive includes a triazole and a non-ionic surfactant including a polyoxyethoxylated reaction product of sorbitan and a fatty acid. The triazole and the non-ionic surfactant are dissolved in the solvent.

The solvent may be, for example, methanol, ethanol, propanol, isopropanol, butanol, isobutanol, water, or combinations thereof. The triazole may be, for example, 1,2,3-benzotriazole or tolyltriazole. The fatty acid may be, for example, oleic acid or stearic acid. The non-ionic surfactant may be, for example, polyoxyethylene sorbitan monooleate or polyoxyethylene sorbitan monostearate.

The weight-to-volume ratio of the non-ionic surfactant in the solvent may be between 50% and 90%. The concentration of the triazole with respect to the non-ionic surfactant and the solvent may be, for example, between 0.25 wt % and 25.0 wt %, and preferably between 2.5 wt % and 20.0 wt %, and more preferably between 5.0 wt % and 15.0 wt %.

For purposes of testing the additive for controlling uniform corrosion and pitting corrosion in the steel rebars, carbon-manganese steel rebars were used, each having a length of 150 mm and a diameter of 12 mm. The steel rebars were de-scaled by abrasion with a motorized wheel fitted with sandpaper. The rebars, following cleaning with acetone, were embedded in a concrete mixture with a binder (cement):water:aggregate (sand) ratio of 1.0:0.5:2.0. After curing the concrete for 28 days following the standard recommended procedures, the concrete samples were subjected to wet/dry treatments. The concrete samples were kept wet in 0.6M chloride solution for 7 days, followed by drying in a laboratory environment for 8 days. These wet/dry treatments were taken as one cycle. Such wet/dry treatments augment the migration of moisture, gases and chloride ions through the samples, thus accelerating the onset and propagation of corrosion reactions at the surface of the embedded rebars.

The polarization resistance of the rebars was measured by electrochemical impedance spectroscopy (EIS). In this technique, a sinusoidal voltage of 10 mV was introduced at the corroding interface at their corrosion potentials. The frequency of the sinusoidal voltage was varied between 100 KHz and 0.001 Hz. The resulting impedance and shift in phase with change in frequency was monitored using a potentiostat. For determination of polarization resistance and other impedance parameters of the corroding surfaces in the presence (and in the absence) of admixtures, a constant phase element (CPE) model was used to extract data from the respective plots. Polarization resistance measured by this technique is inversely related to the corrosion current density ($I_{corr}$) and follows the Stern-Geary equation:

$$I_{corr} = B/R_p,$$

where B is a constant and $R_p$ is the polarization resistance (measured in $\Omega \cdot cm^2$). The Stern-Geary equation shows that the corrosion current density, and thus the corrosion rate of a corroding metal-electrolyte interface, has an inverse relationship with $R_p$.

For purposes of testing the additive for controlling water permeability through the cured concrete, 20 mm×20 mm×20 mm cubes of concrete were cast. Cubes containing the present additive and control cubes with no additive were cast. The cubes were cast with a concrete mixture with a binder (cement):water:aggregate (sand) ratio of 1.0:0.5:2.0. After curing the concrete for 28 days following the standard recommended procedures, the concrete samples were kept in a laboratory environment for 90 days. The weights of the cubes following casting ($W_C$) were then recorded with a precision of up to the third decimal point of a gram. The cubes were then fully immersed in tap water for seven days. Following removal from the water, they were kept in an open laboratory atmosphere for 24 hours to allow the water on the upper surfaces of the cubes to vaporize. The weights of the cubes following immersion and vaporization ($W_I$) were then recorded. The difference in weights ($\Delta W = W_I - W_C$) provided the quantity of water absorbed by the cubes after their immersion in water. The averages of water absorbed for three identical cubes in the absence of the additives (AWA) and in the presence of the additives ($\Delta W_P$) were determined. The percentage retardation efficiency of the additives (% RE) in reducing the permeability of water through the cast cubes was determined as:

$$\% RE = \frac{\Delta W_A - \Delta W_P}{\Delta W_A} \times 100.$$

In order to assess the workability/plasticity of the concrete according to ASTM C1437, the concrete was placed in two layers in a specified mold on a flow table. The two layers were tamped 20 times with a specified tamper. The tamping pressure was kept just sufficient to ensure uniform filling of the mold. Next, the concrete was cut off to smooth the surface, and then the mold was lifted away from the concrete one minute after completing the mixing operation. The table was immediately dropped 25 times in 15 seconds. Then, the diameter of the concrete along the four lines scribed in the tabletop were measured to calculate the flow index.

Example 1

General Method of Preparing Additive

A pre-weighed amount of the non-ionic surfactant was dissolved in a solvent after mixing in an appropriate container, such as a glass or metal vessel, using a mechanical or magnetic stirrer in the temperature range of 25° C.-50° C. The non-ionic surfactant may be, for example, polyoxyethylene sorbitan monooleate or polyoxyethylene sorbitan monostearate, or any other similar reaction product of sorbitan and a fatty acid followed by ethoxylation of the reaction product. The solvent may be, for example, methanol, ethanol, propanol, isopropyl alcohol, or tap water. The mixing ratio of the non-ionic surfactant to solvent may be, for example, 50-90 parts of the non-ionic surfactant in 100 parts of the solvent. The mixing time may vary from 300 seconds to 1500 seconds or more. This mixture is hereinafter referred to as "component A". A pre-weighed amount of a triazole compound was added to component A under vigorous mixing until the triazole was completely dissolved in component A, forming "component B". The triazole compound may be, for example, 1,2,3-benzotriazole, tolyltriazole, or any other suitable similar triazole. The preferred content of the triazole is 0.5 wt % to 25 wt % of the weight of component A, more preferably 2.5 wt % to 20 wt %, and still more preferably 5 wt % to 15 wt %.

Example 2

Specific Example of Preparing Additive

The additive was prepared as described in Example 1 by mixing polyoxyethylene sorbitan monooleate and 1,2,3-benzotriazole in chloride-free and sulfate-free tap water or industrial grade ethyl alcohol and stirring by a mechanical stirrer at room temperature, resulting in a homogenous emulsion-type mixture or a transparent solution. Specifically, 30 grams of polyoxyethylene sorbitan monooleate was dissolved in 25 mL of industrial grade ethanol, followed by the addition of 25 mL of distilled water under constant stirring at room temperature. Thereafter, 5 grams of 1,2,3-benzotriazole was added to the mixture. The total volume was increased to 100 mL through the addition of distilled water. The mixture was kept under constant stirring at room temperature for about 30 minutes. The prepared additive prepared in this manner was stored in a glass or HDPE (high-density polyethylene) plastic container with a shelf life of about 12 months.

Example 3

Corrosion Control Efficiency of Additive

Figure 1B:
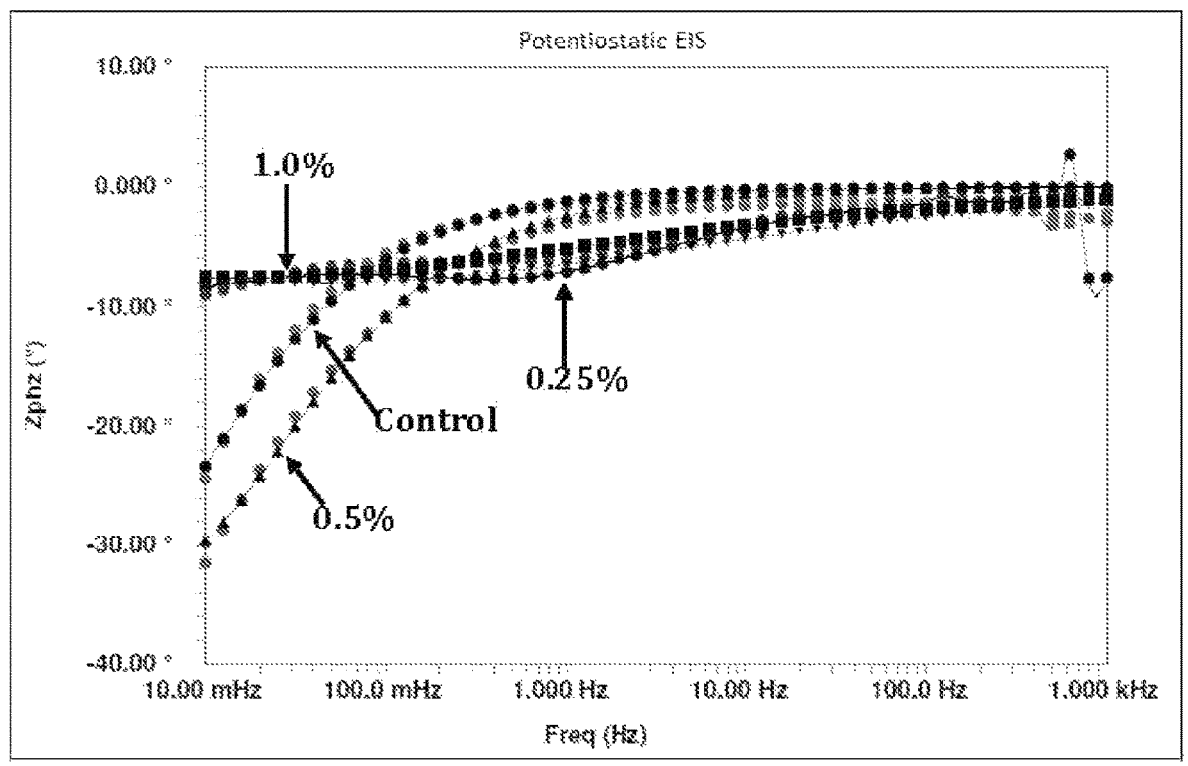
FIG. 1B is a composite comparing EIS plots (Bode plots of the phase angle of the impedance as a function of frequency) for a control sample of steel rebar embedded in concrete and samples of steel rebar embedded in concrete and treated with the additive for reinforced concrete at varying concentrations.

FIGS. 1A and 1B illustrate impedance plots produced using an electrochemical impedance spectroscopic (EIS) technique after 48 cycles of wet/dry treatments (24 months of treatments) in 0.6M chloride solution. The reinforced concrete was prepared as described in Example 2. Samples made with the addition of the additive at varying concentrations of 0.25 wt %, 0.5 wt % and 1.0 wt % with respect to the cement in the concrete mixture were tested. The water-to-cement ratio was 0.5. In FIGS. 1A and 1B, the plot labeled "Control" represents the results taken from control samples that were prepared with no additive.

The impedance plots of FIG. 1A incorporate various electrical components of the corroding interface, such as the polarization resistance ($R_p$), which is inversely proportional to corrosion rate, the solution and film resistance ($R_u$), and capacitance components (Y0). The impedance values at the lowest studied frequency of the plots are normally taken as the polarization resistance, and the impedance values at the highest studied frequency are taken as the uncompensated resistance ($R_u$). It can be seen in FIG. 1A that the polarization resistance component of the impedance (at a frequency of 10 mHz) in the presence of 0.25% and 0.5% of the additive are considerably higher than that of the control rebar. This shows that the additive strongly controls the corrosion rate of the steel reinforcement bars embedded in the concrete.

Example 4

Values Extracted From EIS Plots

The results shown in FIGS. 1A and 1B (and discussed above in Example 3) are qualitative. To obtain the corresponding quantitative data, the plots of FIGS. 1A and 1B were fitted with a simulated equivalent electrical circuit of a constant phase element model (CPE), and the data from the best fit results were extracted. The extracted values of $R_p$ and Y0 are shown below in Table 1.

As shown in Table 1, the polarization resistance, which is directly proportional to the corrosion resistance of the reinforcement bars embedded in the concrete, is considerably higher for the samples containing the additive than for the control rebars. The Y0 component, which incorporates capacitance values of the corroding interface, are significantly lower for the rebars treated with the additive than for the control sample. The higher values of the Y0 component indicates that the corroding interfaces had a leaky layer and are more prone to the onset and propagation of corrosion reactions.

TABLE 1

Quantitative Data Extracted From FIGS. 1A and 1B

| Concentration of Additive (%) | Electrochemical Parameters | |
|---|---|---|
| | $R_p$ ($\Omega \cdot cm^2$) | Y0 ($\Omega^{-1} cm^{-2} s''$) |
| 0 (control) | $2.24 \times 10^4$ | $11.6 \times 10^{-7}$ |
| 0.25 | $3.83 \times 10^6$ | $1.75 \times 10^{-7}$ |

TABLE 1-continued

Quantitative Data Extracted From FIGS. 1A and 1B

| Concentration of Additive (%) | Electrochemical Parameters | |
|---|---|---|
| | $R_p$ ($\Omega \cdot cm^2$) | Y0 ($\Omega^{-1} cm^{-2} s''$) |
| 0.5 | $5.04 \times 10^6$ | $1.04 \times 10^{-7}$ |
| 1.0 | $3.35 \times 10^4$ | $10.84 \times 10^{-7}$ |

Example 5

Water/Moisture Permeability in Treated Concrete Cubes

With regard to the effect of the additive on the retardation of the permeability of water/moisture through the cured concrete cubes, the percentage retardation efficiencies (calculated as described above) are shown in Table 2 below. The results of Table 2 show that the concrete cubes cast with the additive effectively control the permeability of water.

TABLE 2

% Retardation Efficiencies (RE) of Additive on Permeability of Water

| Concentration of Additive (%) | $\Delta W_A$ (g) | Average $\Delta W_A$ (g) | $\Delta W_P$ (g) | Average $\Delta W_P$ (g) | % RE |
|---|---|---|---|---|---|
| 0 (control) | 11.051 | | — | — | — |
| 0 (control) | 11.055 | 11.049 | — | — | — |
| 0 (control) | 11.043 | | — | — | — |
| 0.25% | — | | 7.275 | | |
| 0.25% | — | — | 7.129 | 7.202 | 34.81 |
| 0.25% | — | | 7.202 | | |
| 0.5% | — | | 4.832 | | |
| 0.5% | — | — | 4.801 | 4.818 | 56.39 |
| 0.5% | — | | 4.822 | | |
| 1.0% | | | 4.583 | | |
| 1.0% | — | | 4.585 | 4.582 | 58.52 |
| 1.0% | | | 4.580 | | |

Example 6

Efficacy of Additive as Super Plasticizer

With regard to the efficacy of the additive as a super plasticizer for increasing the workability of concrete, testing was performed as described in ASTM 1437, and as discussed above. The water-to-cement ratio (w/c) for the slump was maintained at 0.40. Table 3, below, provides the results of the testing, which show that the inclusion of the additive in the concrete mix considerably increases the slump area compared against the control samples.

TABLE 3

Plasticity Results at Differing Concentrations of Additive with w/c = 0.4

| Concentration of Additive (%) | Plasticity (% Flow) |
|---|---|
| 0 (control) | 63 |
| 0.0625 | 93 |
| 0.125 | 89 |
| 0.250 | 88 |

TABLE 3-continued

Plasticity Results at Differing Concentrations of Additive with w/c = 0.4

| Concentration of Additive (%) | Plasticity (% Flow) |
|---|---|
| 0.500 | 85 |
| 1.00 | 93 |

Example 7

Effect of Additive Against Chloride-Induced Pitting of Rebars

Figure 2:
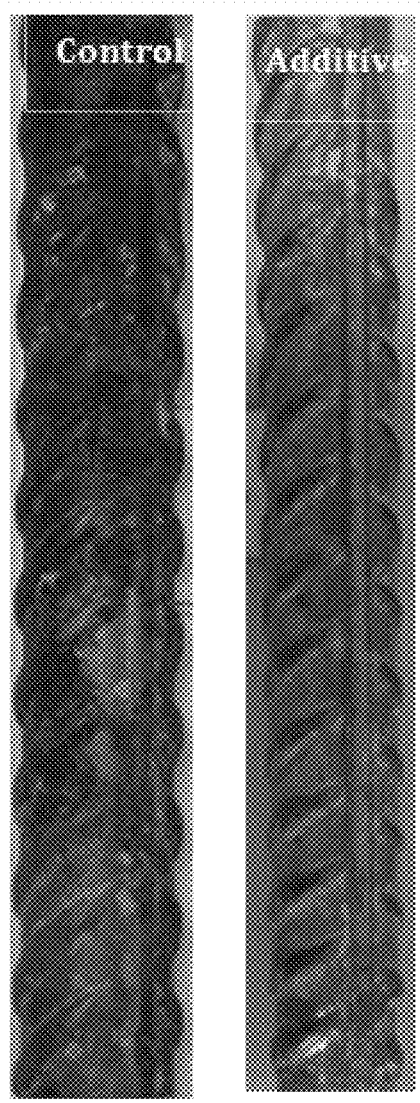
FIG. 2 is a comparison of photographic images of steel rebar samples removed from a control concrete sample and a concrete sample treated with the additive for reinforced concrete at 0.25% of the weight of cement in the mix.

In the present experiment, after 37 cycles of wet/dry treatment, one set of rebars was removed by breaking the concrete. The digital photographs of FIG. 2 show that the surface of the rebars embedded in the control sample of reinforced concrete experienced severe pitting attack. Under identical test conditions, the rebars embedded in the concrete with the additive included in the mix (at concentrations of 0.25%450% with respect to the weight of cement) did not show any trace of rust or pits on their surfaces.

It is to be understood that the additive for reinforced concrete is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An additive for reinforced concrete, consisting of a mixture of:
   a triazole compound;
   a non-ionic surfactant, the surfactant being a poly oxy ethoxylated reaction product of sorbitan and a fatty acid; and
   a solvent, the triazole compound and the non-ionic surfactant being mixed in the solvent.

2. The additive for reinforced concrete as recited in claim 1, wherein the solvent comprises at least one solvent selected from the group consisting of methanol, ethanol, propanol, isopropanol, butanol, isobutanol, and water.

3. The additive for reinforced concrete as recited in claim 1, wherein the triazole compound is selected from the group consisting of 1,2,3-benzotriazole and tolyltriazole.

4. The additive for reinforced concrete as recited in claim 1, wherein the fatty acid is selected from the group consisting of oleic acid and stearic acid.

5. The additive for reinforced concrete as recited in claim 1, wherein the non-ionic surfactant is selected from the group consisting of polyoxyethylene sorbitan monooleate and polyoxyethylene sorbitan monostearate.

6. The additive for reinforced concrete as recited in claim 1, wherein a solution of the non-ionic surfactant in the solvent has a concentration of between 50% and 90% weight of the non-ionic surfactant/volume of the solvent.

7. The additive for reinforced concrete as recited in claim 6, wherein the additive has a concentration of the triazole compound with the solution of claim 6 of between 0.25% and 25.0% weight of the triazole compound/volume of the solution of claim 6.

8. Reinforced concrete, comprising a cured and hardened mixture of water, an aggregate, cement, and the additive according to claim 1 having at least one steel rebar embedded in the mixture.

9. The reinforced concrete as recited in claim 8, wherein the mixture has a ratio of the additive according to claim 1 to the cement in the mixture of between 0.25 wt % and 1.0 wt %.

10. The reinforced concrete as recited in claim 8, wherein the mixture has a ratio of water to cement (w/c ratio) between 0.4 and 0.6.

* * * * *